US011197035B2

(12) United States Patent
Pikes et al.

(10) Patent No.: US 11,197,035 B2
(45) Date of Patent: *Dec. 7, 2021

(54) VIDEO ANALYSIS METHOD AND SYSTEM

(71) Applicant: IMAGE ANALYSER LTD., Gloucester (GB)

(72) Inventors: Crispin Pikes, Hampshire (GB); Randhir Shinde, Pune (IN)

(73) Assignee: IMAGE ANALYSER LTD, Gloucester (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/184,538

(22) Filed: Nov. 8, 2018

(65) Prior Publication Data

US 2019/0349613 A1 Nov. 14, 2019

Related U.S. Application Data

(63) Continuation of application No. 15/894,806, filed on Feb. 12, 2018, now Pat. No. 10,154,291, which is a (Continued)

(30) Foreign Application Priority Data

Sep. 5, 2013 (GB) ...................................... 1315859

(51) Int. Cl.
*H04N 21/234* (2011.01)
*H04N 21/266* (2011.01)
(Continued)

(52) U.S. Cl.
CPC ..... *H04N 21/23418* (2013.01); *H04N 21/222* (2013.01); *H04N 21/26603* (2013.01); *H04N 21/44008* (2013.01); *H04N 21/4542* (2013.01)

(58) Field of Classification Search
None
See application file for complete search history.

(56) References Cited

U.S. PATENT DOCUMENTS 8,359,642 B1 1/2013 Wurtenberger et al.
8,789,085 B2 * 7/2014 Vilei ....................... G06T 7/223
725/25

(Continued)

FOREIGN PATENT DOCUMENTS

CN 10-1853377 10/2010
CN 10-2073676 5/2011
(Continued)

OTHER PUBLICATIONS

International Search Report for PCT/GB2014/050920 dated Jul. 4, 2014, five pages.
(Continued)

*Primary Examiner* — Omar S Parra
(74) *Attorney, Agent, or Firm* — Nixon & Vanderhye, P.C.

(57) ABSTRACT

The present invention relates to a video analysis method, including: receiving a plurality of chunks of a video streamed from a server; extracting one or more frames from each chunk; analysing each frame in accordance with a static image analysis engine to generate a pornographic content rating for the frame; and combining the ratings of the frames from the plurality of chunks to generate a pornographic content rating for the video. A system and software for analysing video also described.

24 Claims, 3 Drawing Sheets

Related U.S. Application Data continuation of application No. 14/758,044, filed as application No. PCT/GB2014/050920 on Mar. 24, 2014, now Pat. No. 9,930,376.

(51) Int. Cl.
  *H04N 21/44* (2011.01)
  *H04N 21/454* (2011.01)
  *H04N 21/222* (2011.01)

(56) References Cited

U.S. PATENT DOCUMENTS

| | | | |
|---|---|---|---|
| 2003/0012399 A1* | 1/2003 | Wu | H04N 7/163 382/100 |
| 2009/0037965 A1 | 2/2009 | Tsai | |
| 2009/0249465 A1 | 10/2009 | Touboul | |
| 2009/0274364 A1* | 11/2009 | Shakya | G06K 9/00362 382/165 |
| 2015/0278606 A1* | 10/2015 | Laksono | G06F 16/7837 382/103 |

FOREIGN PATENT DOCUMENTS

| | | |
|---|---|---|
| CN | 10-2567738 | 7/2012 |
| EP | 2293256 | 12/2011 |
| EP | 2 690 867 A1 | 1/2014 |
| WO | WO 2012132532 A1 | 4/2012 |

OTHER PUBLICATIONS

Search Report for GB1405251.8 dated Apr. 14, 2014, six pages.
EP Communication in European Application No. 14 719 346.0 dated Nov. 7, 2018.

* cited by examiner

VIDEO ANALYSIS METHOD AND SYSTEM

CROSS-REFERENCE TO RELATED APPLICATIONS

This application is a continuation of U.S. patent application Ser. No. 15/894,806 filed Feb. 12, 2018; which is a continuation of U.S. patent application Ser. No. 14/758,044 filed Jun. 26, 2015, now U.S. Pat. No. 9,930,376 issued Mar. 27, 2018; which is the U.S. national phase of International Application No. PCT/GB2014/050920 filed Mar. 24, 2014; which claims priority to GB Application No. 1315859.7 filed Sep. 5, 2013. The disclosures of these applications are incorporated herein in their entirety by reference.

FIELD OF INVENTION

The present invention is in the field of video analysis. More particularly, but not exclusively, the present invention relates to analysing video for pornographic content.

BACKGROUND

Historically web filters have been used to filter pornography on the Internet by blocking websites based on URL blacklists and lexical analysis. These techniques are becoming less effective as the Internet is becoming more dynamic. They also are ineffective at addressing pornographic videos which can be found on media sharing sites that would be considered legitimate by a blacklist filter. Lexical analysis is also ineffective as online videos often have little text associated with them that would indicated the videos contents is pornographic.

One solution to this may be to intercept the video stream and analyse the content of the video using computer vision techniques. However video analysis is time consuming and delaying the video while it is being analysed can be detrimental to the user experience and cause connection problems.

Therefore, there is a desire for an improved video analysis system which is less time consuming.

It is an object of the present invention to provide a video analysis system which overcomes the disadvantages of the prior art, or at least provides a useful alternative.

SUMMARY OF INVENTION

According to a first aspect of the invention there is provided a video analysis method, including:

a) receiving a plurality of chunks of a video streamed from a server;

b) extracting one or more frames from each chunk;

c) analysing each frame in accordance with a static image analysis engine to generate a pornographic content rating for the frame; and d) combining the ratings of the frames from the plurality of chunks to generate a pornographic content rating for the video.

At least some of the chunks may be non-contiguous within the video. The chunks may be requested from the server. The chunks may be requested from a plurality of locations within the video. The locations for the chunks within the video may be determined based, at least, upon the size of the video and the frame rate of the video. The locations for the chunks may be separated by a predefined interval. The size of the chunks may be determined based, at least, upon the size and length of the video.

The method may further include the step of generating an action if the rating for the video exceeds a predefined threshold.

Metadata relating to the video may be extracted from header information for the video.

The frames may be extracted from each chunk using a video decoder.

The video analysis method may be performed simultaneously with transmission of the video to a video client. Transmission of the video to the video client may be throttled whilst the video analysis method is analysing the video.

The method may further include the step of receiving a request to analyse the video from a video transmission system; wherein the rating is generated for the video in response to the request from the video transmission system. The request may come via a database.

The method may further include the steps of receiving a request from a client device to analyse the video; and transmitting the pornographic content rating for the video to the client device in response to the request. A module at the client device may identify a request for streaming the video, may transmit the request to analyse the video, and may determine whether the video is played or not based upon the pornographic content rating. That module may be a plug-in to a browser executing on the client device.

According to a further aspect of the invention there is provided a system for analysing videos, comprising:

a communications apparatus configured to receive a plurality of chunks from a video streamed from a server; and a processor configured to extract one or more frames from each chunk; to analyse each frame in accordance with a static image analysis engine to generate a pornographic content rating for the frame; and to combine the ratings of the frames from the plurality of chunks to generate a rating for the video.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides a video analysis system and method for detecting pornographic content within a video stream.

The inventors have discovered a solution which can significantly reduce the time to download a video and analyse it.

Rather than downloading and analysing the entire video the inventors propose, in one implementation of the solution, downloading chunks of data at specific locations across the length of the video. The size of the chunks may dynamically change depending on the length and resolution of the video. One or more frames can be extracted from each of the chunks for analysis using static image computer vision techniques. This solution may considerably reduce the amount of data that is required to be downloaded and analysed, which may significantly reduce the time it takes to generate a result.

Figure 1:
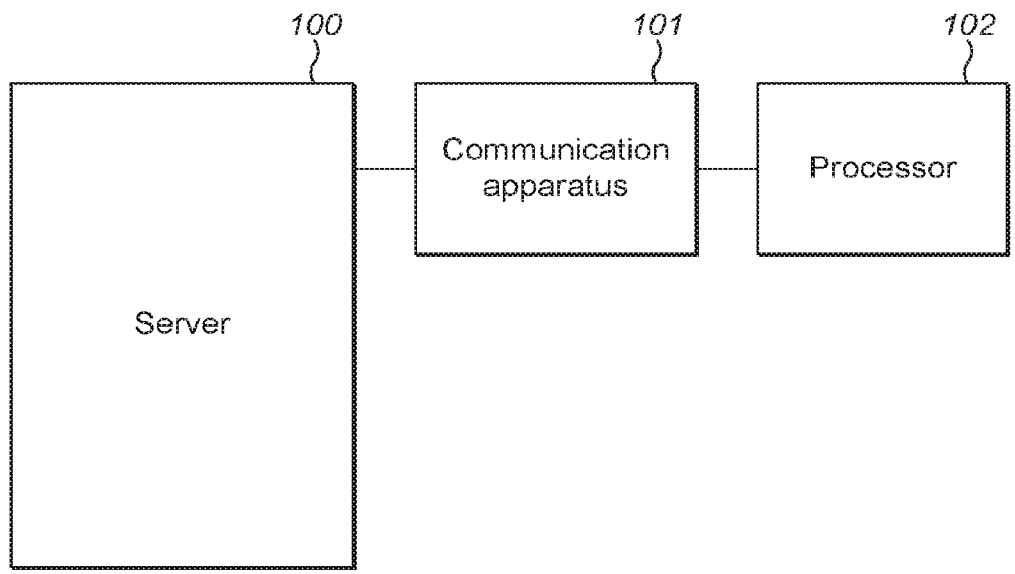
FIG. 1: shows a block diagram illustrating a system in accordance with an embodiment of the invention.

In FIG. 1, a video analysis system in accordance with an embodiment of the invention is shown.

A server 100 is shown. The server 100 is configured to stream videos to clients in response to requests from those clients. For example, the server 100 may be a web server receptive to HTTP/HTTPS requests. The server 100 may be further configured to stream chunks from requested locations within the video.

A communications apparatus 101 is shown. The communications apparatus 101 is configured to receive chunks from a video from the server 100. The communications apparatus 101 may be further configured to request the chunks from within the video. The chucks may be requested from specific locations within the video.

A processor 102 is shown. The processor 102 is configured to extract frames from each chunk and analyse each frame using a static image analysis engine to generate a rating for the frame.

The processor 102 is further configured to combine the ratings of the frames from the chunks to generate a rating for the video.

The processor 102 may store the ratings within a database or may deliver the ratings to another processor managing onward transmission of a video stream for the video to a user device.

The server 100 and communication apparatus 101 may communicate across a network or interconnecting networks, such as the Internet.

Figure 2:
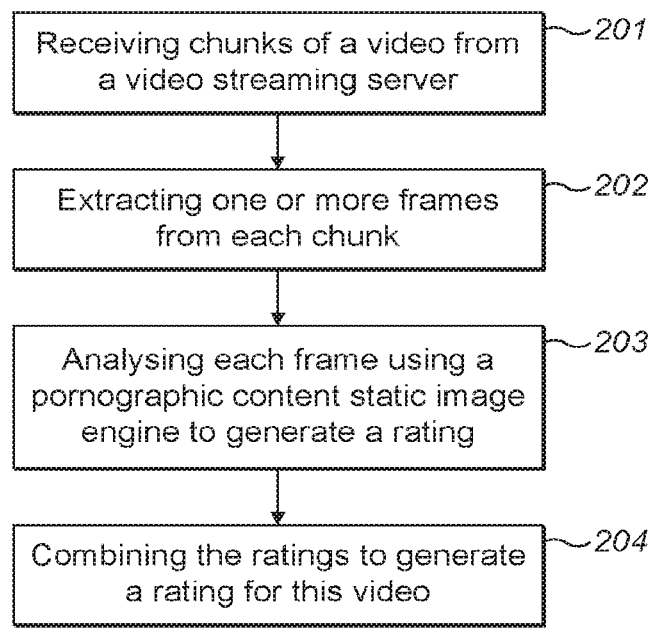
FIG. 2: shows a flowchart illustrating a method in accordance with an embodiment of the invention.

In FIG. 2, a method for analysing videos in accordance with an embodiment of the invention is shown.

In step 201, chunks from a video may be received from a video streaming server.

The chunks may be individually requested, and may be non-contiguous within the video. And the chunks may be selected from across the video. A possible advantage to requesting the chunks non-contiguously is that a more representative sample of video can be received and assessed more quickly than receiving and assessing the entire video. In an alternative embodiment, the chunks may be received after a single request for a video stream. This embodiment may permit analysis of videos from those streaming video servers that only support requests for the entire video stream (i.e. contiguous chunks) rather than chunks across the video.

The locations of the chunks may be determined by first selecting a plurality of frames separated by a predefined period within the video, and calculating the location (i.e. the byte location) of those frames within the video stream. The determined location may be shifted backwards by a predefined number of bytes to assist in downloading an uncorrupted frame.

The size of the chunk to request may be determined by a calculated size of a frame (utilising the file size of the video and the frame rate). The size of the chunk may be increased by a predefined number of bytes to capture data before the frame and a predefined number of bytes to capture data after the frame, to assist in downloading an uncorrupted frame.

In an alternative embodiment, the chunks may be received in response to a single request for the video and may be contiguous for at least a substantial portion of the video or the entire video.

The video may be requested in response to a request to analyse the video. The request may come from a video transmission system which is receiving a video stream for the video from the video streaming server. The request may be extracted from a database in which the video transmission system has stored the request. The chunks may be received from the video transmission system, or more preferably, may be separately requested from the video streaming server. In one embodiment, chunks relating to a lower resolution version of the video may be requested from the server.

In step 202, one or more video frames may be extracted from each chunk. The chunk may be first processed by a video decoder to generate frames. One or more non-corrupted frames may be selected from the generated frames.

In step 203, those video frames may be analysed by a static image analysis engine to determine the likelihood that the video frames contain pornographic content. The likelihood is converted into a rating for each video frame. For example, the static image analysis engine may return a rating of 1 if the frame is considered to contain pornographic content or 0 if the frame is not considered to contain pornographic content. It will be appreciated that a methodology assigning a rating between 1 and 0 could be used.

The static image analysis engine may utilise any number of techniques to determine pornographic content including one or more from the set of skin-tone detection, curvature detection, body part detection, face detection, and image smoothness. It will be appreciated that other techniques can used and that weighted methods utilising a plurality of techniques can be used within the static image analysis engine.

In step 204, the ratings of the video frames are combined into a single pornographic content rating for the video. For example, if the total number of frames comprising pornographic content as a percentage of total analysed frames exceeds a predefined threshold, then the video will be given a rating of 1 indicating that video is considered to contain pornographic content. Otherwise the video will be given a rating of 0, indicating that the video is not considered to contain pornographic content. It will be appreciated that a methodology assigning a rating between 1 and 0 could be used, or a different methodology for assessing the plurality of frames could be used.

In one embodiment, the rating may be stored in a database accessible to the video transmission system and the video transmission system may take action in relation to the onward transmission of the video to a video client—i.e. by blocking the onward transmission, for example, if the rating indicates that the video is pornographic.

Figure 3:
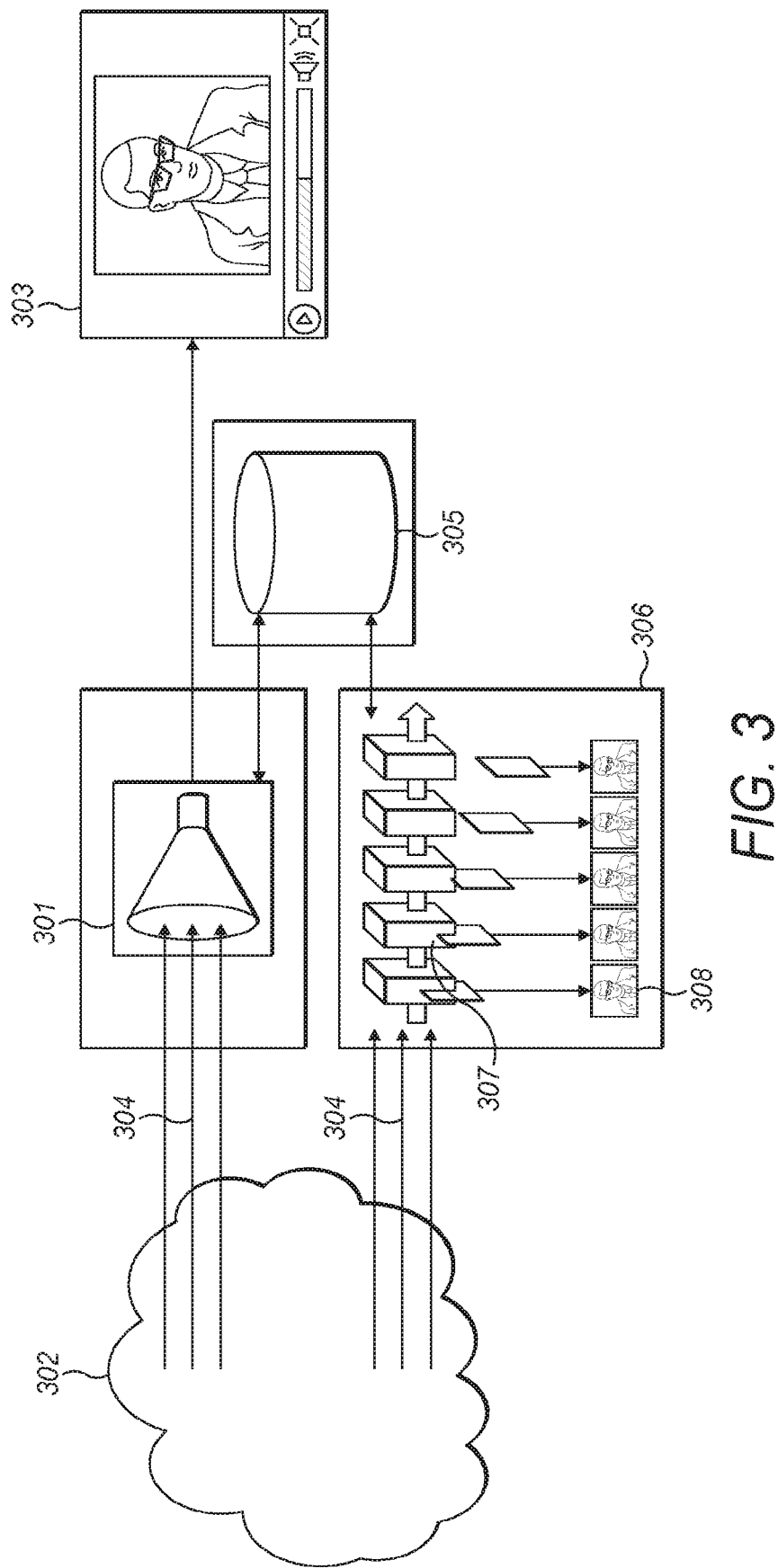
FIG. 3: shows a block diagram illustrating a system in accordance with an embodiment of the invention.

In FIG. 3, an embodiment of the invention will be described.

A Video Throttling (VT) Proxy Server 301 listens on a port for web requests to web servers accessible via the Internet 302 or a network from a browser 303 or device. The proxy server 301 intercepts the responses 304 to each request to identify whether they contain video data. If no video data is identified the response is sent to the requesting browser 303 or device. If the response 304 contains video data then the VT proxy 301 performs a look up of the video URI in a URI database 305. If the URI is not present in the database 305 then it will be added and the status set to Waiting To Be Scanned. If the URI is present in the database 305 and the status is Scanning Complete it will check the result and take action based upon the result. If the URI is present in the database 305 and the status is Scanning In Progress then the VT Proxy 301 will start throttling the data.

The VT Proxy 301 sends an initial 1000 bytes of data to the requesting browser 303 or device to ensure the request does not time-out. The number of initial bytes is configurable. For example, the number of initial bytes may be configured to ensure that the header for the video (including metadata information), which is typically streamed before the video content, is entirely transmitted to the browser 303.

The VT Proxy 301 then polls the database 305 periodically for the video length. This information is added to the database 305 by a Video Rating System 306. When the information is available the VT Proxy 301 then calculates the throttling rate which is the number of bytes to be sent after a specified pause. Preferably the specified pause is 1 millisecond. In one embodiment, the pause is configured as small as supported by the hardware and operating system.

The throttling rate may be $$t = \frac{s * p}{(l - d)}$$

where:
t=Throttling Rate (Bytes)
s=Video Size (Kilobytes)
l=Video Length (Seconds)
d=Delay (Seconds)
p=Pause (Milliseconds)

The value of d may be calculated as a percentage of the video length. This percentage is configurable.

For example, where the delay percentage is 5% and the video is of length 100 seconds, the video size is 100 thousand Kilobytes, and the pause is 1 millisecond, there will be a delay of 5 seconds and the throttling rate will be 1053 bytes.

In an alternative configuration, the throttling rate is predefined and the pause is calculated, for example, using the following formula:

$$p = t(l-d)/s$$

For example, given the original example, where the throttling rate is 2000 bytes, the pause will be 1.9 milliseconds.

Once the value of t is calculated the VT Proxy 301 release t bytes to the requesting browser 303 or device, it then checks the database 305 for a result and waits 1 millisecond before it sends another t bytes. It repeats this process until a result is present. The VT Proxy 301 can modify its behaviour based on the result for example it could increase throttling, decrease throttling or terminate the connection.

Increasing the throttle effectively pauses the video until the throttle is decrease or the connection terminated. This happens because there is no data in the client's video buffer to support playback.

Decreasing the throttle will effectively allow the video to play as normal and the client's video buffer to be filled.

Terminating the connection will effectively block the video as no more data will be sent to the requesting browser 303 or device. As the video buffer only contains data a few seconds ahead of playback the video will stop playing shortly after the connection is terminated.

The Video Rating (VR) System 306 has a dedicated thread to check the database 305 for video URI's with the status Waiting To Be Scanned. When a video URI with the above status is identified it changes the status to Scanning in Progress and starts downloading 304 the video on a separate thread. If the video is greater than 480 p then to improve performance the VR System 306 will attempt to download the video in 480 p; if it is available or the lowest resolution above it. Once the video header is received it decodes the data using a video decoder and updates the database 305 with the video length in seconds (LengthSeconds), file size and frame rate (FR). The VR System 306 also uses the header information to calculate parameters for the scanning logic.

The VR System 306 utilises the following parameters for the scanning logic:
  1. Seconds to Skip per Frame (SSF)
  2. Minimum number of frames to scan—(MinFS)
  3. Maximum number of frames to scan—(MaxFS)
  4. Seconds either side of frame (ESF)

From the video header the VR System 306 retrieves the total size of the video in seconds which is LengthSeconds The SSF defines the gap in seconds between each frame extraction; LengthSeconds/SSF will give the total number of frames to extract (TFE). If LengthSeconds/SSF is greater than MaxFS then the TFE for scanning will equal MaxFS or if LengthSeconds/SSF is less than MinFS then the TFE for scanning will equal MinFS. If either of these are true then a new SSF is calculated as LengthSeconds/MaxFS or LengthSeconds/MinFS.

The VR System 306 has two separate modes for downloading the video data; Sequential mode and Intermittent mode In Sequential mode the VR System 306 downloads the entire video from beginning to end like a video player. This is done if the video is very short in length or the video does not support range header requests. The advantage of this mode is that it produces a minimal number of corrupt frames however the disadvantage is that it takes longer to download the data as all the data is required.

In Intermittent mode the VR System 306 only downloads chunks 307 of data at various locations along the video length based on the total number of frames to extract. The advantage of this mode is that only a fraction of the data needs to be downloaded which significantly improves the performance however the disadvantage of this mode is a higher number of corrupt frames are produced.

In Intermitted mode the following formula is used to calculate the location of each frame that is to be extracted:
File Size/Total Frames=Frame Size
Frame Size*(SSF*FR)=Bytes to Skip per Frame (BSF)

The BSF is the number of bytes to skip between each frame that is to be downloaded.

In Intermittent mode the following formula is used to calculate the size of each data chunk to be download:
Frame Size*(ESF*FR)=Data Chunk Size (DCS)

The Data Chunk Size is the number of bytes to be downloaded before and after each frame that is to be extracted.

The VR System 306 then downloads each chunk 307 of data using a "range" parameter in the http request. Once it has the required chunks 307 of data it decodes the frames from each chunk 307 using a video decoder. The VR System 306 then selects one or more frames 308 from each chunk 307 and passes it to the pornographic content recognition engine for analysis. When all the frames have been analysed the pornographic content recognition engine returns a result as to whether the video is pornographic or not. The result is written to the database 305 and the status for the URI is changed to Scanning Complete.

Embodiments of the invention may be deployed in a variety of deployment configurations including cloud, hybrid and on premise. It will be appreciated that embodiments of the invention may be implemented within software, hardware, or a combination of both.

An application program interface may be provided to facilitate interoperation by client devices or other systems with embodiments of the invention.

Cloud Deployment

The cloud deployment allows the VT Proxy 301, VR System 306 and database 305 to be deployed in the cloud as a Software-as-a-Service (SaaS) solution. Client devices are configured to browse via the cloud based proxy and no client side software is required.

Hybrid Deployment

The hybrid deployment allows for the VT Proxy 301 to be deployed on the client device or within the local network while the VR System 306 and database 305 are deployed in the cloud. The client device is configured to use the local instance of the VT Proxy 301 which communicates with the database 305 hosted in the cloud. It is also possible to deploy the VR System 306 locally and only have the database 305 deployed in the cloud.

On Premise Deployment

The on premise deployment allow for the VT Proxy 301, VR System 306 and database 305 to be deployed on the device or within the local network.

An example of an embodiment of the invention in use will now be described.

A minor connects to the Internet on a PC protected by the invention. He browses to a popular video hosting site and searches recently uploaded video for something that could be pornographic. The traditional web filter allows him to start playing the video as the site is considered legitimate.

The VT Proxy 301 identifies the response contains video data. It looks up the URI in the database 305 and it is not present therefore it adds the URI to the database 305 with a status of Waiting To Be Scanned. The VT Proxy 301 releases an initial 1000 bytes of video data to the browser 303 to maintain the connection.

The VR System 306 downloads the video header and writes the following details to the database 305:
Video length=196 seconds
It also obtains the following information from the video header:
File Size=17081Kb (17490850 bytes)
Total Frames=4899
Frames Rate=24

The VT Proxy 301 obtains the video length from the database 305 and calculates the (t) throttling rate based on a delay (d) of 20 seconds (which is 10.3% of the video length):
17081/(196−20)=97

The value of p is 1 millisecond therefore the throttling rate is 97 bytes. The VT Proxy 301 delivers 97 bytes to the browser 303 and then pauses for 1 millisecond and then sends another 97 bytes; it continues to do this until a result is present in the database 305.

The video starts to play on the browser 303; the beginning of the video is not pornographic. So far the user's experience is unaffected.

The VR System 306 extracts the defined parameters for the scanning logic:
Seconds to Skip per Frame (SSF)=10
Minimum number of frames to scan—(MinFS)=10
Maximum number of frames to scan—(MaxFS)=40
Seconds either side of frame (ESF)=2

The VR System 306 calculates the total number of frames to be extracted (TFE):
196/10=19

The VR System 306 checks that 19 is less than 40 (MaxFS) and greater than 10(MinFS) which it is so the TFE=19.

The VR System 306 calculates the frame size:
17490850/4899=3570 bytes

The VR System 306 calculates the bytes to skip per frame:
3570*(10*24)=856800 bytes The following data positions are identified
1713600
2570400
3427200
4284000
5140800
5997600
6854400
7711200
8568000
9424800
10281600
11138400
11995200
12852000
13708800
14565600
15422400
16279200

The VR System 306 calculates the size of data chunk to be downloaded before and after each data position:
3570*(2*24)=171360 bytes The VR System 306 then downloads each chunk 307 of data using a "range" request in the http request. Once it has the required chunks 307 of data it decodes the frames from each chunk using a video decoder. In this case one frame 308 is selected from each chunk 307 and passed to a pornographic content recognition engine for analysis.

The pornographic recognition engine returns a result that indicates the video is pornographic. The VR System 306 writes this result to the database 305.

The VT Proxy 301 detects and extracts the result from the database 305 8 seconds into the playback of the 196 second long video and terminates the connection. The playback continues until 12 seconds at which point the video stop playing as the video buffer is empty. Therefore, the user is protected from being exposed to age restrictive material.

The user refreshes his browser 303 and tries to play the video again. The VT Proxy 301 identifies the video data and looks up the URI in the database 305.

The URI is present with a result that indicates the video is pornographic and the VT Proxy 301 terminates the connection.

If the video had initially returned a result of non-pornographic the VT Proxy 301 would have decreased the throttle so that the video would have downloaded as normal and the user's experience would have remained unaffected.

Figure 4:
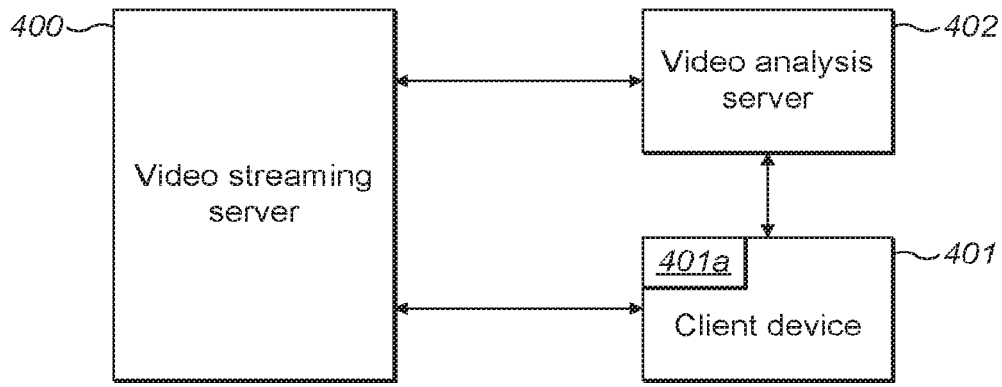
FIG. 4: shows a block diagram illustrating another system in accordance with an embodiment of the invention.
Figure 5:
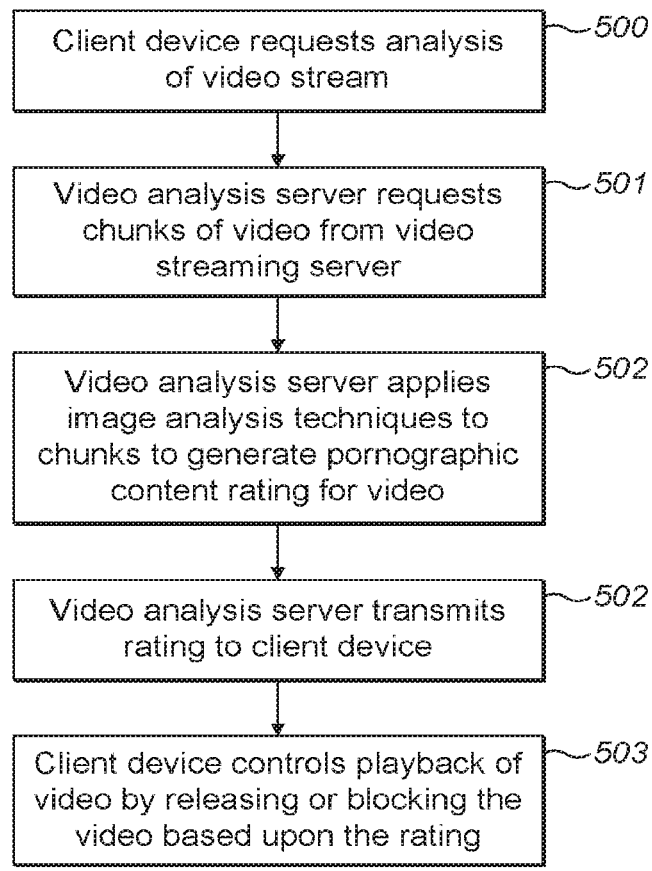
FIG. 5: shows a flowchart illustrating another method in accordance with an embodiment of the invention.

An alternative embodiment of the invention will now be described with reference to FIGS. 4 and 5.

A video streaming server 400 is shown. The video streaming server 400 is configured for transmitting video.

A client device 401 is shown. The client device 401 is configured for requesting a video stream. The client device is further configured to request analysis of a video stream. A module 401a at the client device may be configured to identify requests for videos and to request analysis of the videos. The module 401a may be a software module, such as a plug-in to a browser executing on the client device, or it may be hardware module, such as a chip forming part of a television apparatus.

A video analysis server 402 is shown. The video analysis server 402 is configured to receive requests to analyse video streams, to request chunks of the video from the video streaming server, to perform analysis on the received video using image analysis techniques, to rate the received video based upon the outcome of the image analysis techniques, and to transmit that rating back to the requester.

The video streaming server 400, client device 401, and video analysis server 402 may communicate with one another via a communications network or a combination of communications networks, such as the Internet.

In step 500, a client device 401 may request that a video stream is analysed by the video analysis server 402. The client device may request analyse of the video stream by transmitting a URI for the video stream. The URI may originate from a browser executing on the client device. The module 401a may identify or intercept the URI originating from the browser and transmit it to the video analysis server 402.

In step 501, the video analysis server 402 may request chunks of the video from the video streaming server 400. The chunks are requested sequentially in one embodiment, and non-contiguously for, at least, some of the chunks in an alternate embodiment.

In step 502, the video analysis server 402 may apply image analysis techniques to, at least, a part of, at least, some chunks of the video to generate a pornographic content rating for the entire video.

In step 503, the video analysis server 402 may transmit this rating back to the client device 401.

In step 504, the client device 401 may release the video for playback or indicate that the video has been blocked based upon the rating received.

In one embodiment, the video analysis server 401 may first map the request (i.e. the URI) to a database of previously analysed video stream to avoid repeat analysis of the same video stream. If the request already exists in the database, the stored rating may be transmitted back to the requester.

A potential advantage of some embodiments of the present invention is that a video can be assessed for pornographic content without requiring an externally compiled blacklist, the speed of analysis is improved, and the reliability of video delivery is unimpeded.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A video analysis method, including:
   during streaming of a video from a video streaming server, requesting a plurality of chunks within the video from the video streaming server, wherein the plurality of requested chunks are non-contiguous within the video;
   receiving the plurality of requested chunks within the video streaming server;
   extracting one or more objects from each chunk of the received plurality of chunks;
   analysing each extracted object in accordance with an image analysis engine to generate a content description for the object; and
   combining the descriptions of the objects from the plurality of chunks to generate a content description for the video before receiving the entire video from the video streaming server.

2. The method as claimed in claim 1, wherein the one or more objects are frames.

3. The method as claimed in claim 1, wherein locations for the plurality of received chunks within the video are determined based, at least, upon a size of the video and a frame rate of the video.

4. The method as claimed in claim 1, wherein locations for the plurality of received chunks within the video are determined based on a size of the video and a frame rate of the video, and the plurality of received chunks are separated by a predefined interval from each other.

5. The method as claimed in claim 1, wherein a size of the chunks are determined based, at least, upon a size of the video and a length of the video.

6. The method as claimed in claim 1, further including, based on the content description for the video, releasing the streaming video for playback or blocking further receiving of the streaming video.

7. The method as claimed in claim 1, wherein the analysis is performed during playback of the streaming video.

8. The method as claimed in claim 1, further including: receiving a request from a client device to analyse the video; and transmitting the content description for the streaming video to the client device in response to the request.

9. The method as claimed in claim 8, wherein the client device identifies a request for streaming the video, transmits the request to analyse the video, and determines whether the video is allowed to be played or not based on the content description for the streaming video.

10. The method as claimed in claim 1, further comprising:
    generating an action, before receiving the entire video from the video streaming server, based on the content description.

11. The method as claimed in claim 10, wherein the action includes interrupting the streaming of the video from the video streaming server.

12. The method as claimed in claim 1, further comprising:
    generating an action, before receiving the entire video from the video streaming server, if the content description satisfies a condition.

13. The method as claimed in claim 12, wherein the condition is that the content description includes a rating for the video that exceeds a predefined threshold.

14. The method as claimed in claim 1, wherein the plurality of chunks are requested from the video streaming server with a lower resolution version of the video streamed from the video streaming server.

15. The method as claimed in claim 1, wherein each chunk included data for a plurality of frames and the method further included decoding each of the chunks to extract frames from the chunks.

16. A system for analysing videos, comprising:

a communications apparatus configured to receive chunks of a streaming video from a video streaming server; and a processor configured to:

during streaming of the video from the video streaming server, request a plurality of chunks within the video from the video streaming server, wherein the plurality of requested chunks are non-contiguous within the video;

receive the plurality of chunks within the video from the video streaming server;

extract one or more objects from each chunk of the plurality of received chunks;

analyse each extracted object in accordance with an image analysis engine to generate a content description for the object; and combine the descriptions of the objects from the plurality of chunks to generate a description for the video before receiving the entire video from the video streaming server.

17. The system of claim 16, wherein locations for the plurality of received chunks within the video are determined based, at least, upon a size of the video and a frame rate of the video.

18. The system of claim 16, wherein locations for the plurality of received chunks within the video are determined based on a size of the video and a frame rate of the video, and the plurality of received chunks are separated by a predefined interval from each other.

19. The system of claim 16, wherein the processor is further configured to, based on the content description for the video, receiving the entire video for playback or blocking further receiving of the streaming video.

20. The system of claim 16, wherein the processor is configured to display at least a portion of the video, before receiving the entire video, and the analysis is performed while displaying the streaming video.

21. A communication system comprising at least one processor configured to:

receive video information from a video streaming server for a video requested by a client device from the video streaming server, the video information including at least a size of the video;

based on the received video information, request, from the video streaming server, a plurality of chunks from different locations within the video;

in response to the request, receive the plurality of requested chunks;

extract one or more objects from each chunk of the plurality of received chunks;

analyse each extracted object to generate a content rating for each extracted object; and upon determining that a combined content rating for each extracted object exceeds a predetermined threshold, interrupt transmission of the video from the video streaming server to the client device.

22. The communication system of claim 21, comprising the client device and wherein the client device is configured to request the video from the video streaming server and receive at least a portion of the video from the video streaming server for playback.

23. The communication system of claim 22, wherein the analysis of the extracted object is performed during playback of the video on the client device.

24. A video analysis method, including:

a) receiving a plurality of chunks within a streaming video from a video streaming server;

b) extracting one or more objects from each chunk of the received plurality of chunks;

c) analysing each extracted object in accordance with an analysis engine to generate a content rating for each object d) generating a combined content rating from each of the extracted objects before receiving the entire video from the video streaming server; and e) performing an action in relation to transmission of the streaming video to a video client based upon the combined content rating, wherein the transmission of the streaming video to the video client is throttled during analysis of the extracted objects.

\* \* \* \* \*